United States Patent
Gozdawa

(10) Patent No.: US 6,900,553 B2
(45) Date of Patent: May 31, 2005

(54) GAS TURBOMACHINERY GENERATOR

(76) Inventor: Richard Julius Gozdawa, Building No. 1, Brunel Science Park, Kingston Lane, Uxbridge, Middlesex (GB), UB8 3PQ ( * ) Notice: Subject to any disclaimer, the term of this patent is extended or adjusted under 35 U.S.C. 154(b) by 0 days.

(21) Appl. No.: 10/747,386

(22) Filed: Dec. 29, 2003

(65) Prior Publication Data

US 2004/0140672 A1 Jul. 22, 2004

Related U.S. Application Data

(63) Continuation of application No. 09/995,152, filed on Nov. 27, 2001, now abandoned.

(30) Foreign Application Priority Data

Nov. 30, 2000 (GB) .............................. 0029296

(51) Int. Cl.[7] .............................................. F02C 6/00
(52) U.S. Cl. ........................... 290/52; 290/53; 290/4 D; 290/31; 290/4 R; 290/38 R; 322/10; 322/45; 322/59
(58) Field of Search ........................... 290/4 D, 52, 53, 290/31, 38 R, 4 R; 322/10, 254, 59

(56) References Cited

U.S. PATENT DOCUMENTS

| | | |
|---|---|---|
| 4,669,263 A | 6/1987 | Sugiyama |
| 5,214,910 A | 6/1993 | Adair, Jr. |
| 5,581,128 A * | 12/1996 | Royle .......................... 290/52 |
| 6,410,992 B1 | 6/2002 | Wall et al. |
| 6,724,099 B2 * | 4/2004 | Klaar ........................ 290/4 D |

FOREIGN PATENT DOCUMENTS

| | | |
|---|---|---|
| EP | 0057730 | 8/1982 |
| GB | 283110 | 7/1928 |
| GB | 978890 | 12/1964 |
| GB | 1369844 | 10/1974 |
| GB | 2335953 | 10/1999 |

* cited by examiner

Primary Examiner—Darren Schuberg
Assistant Examiner—Iraj Mohandesi
(74) Attorney, Agent, or Firm—Bliss McGlynn, P.C.

(57) ABSTRACT

A gas turbomachinery electricity generation apparatus includes a gas turbomachinery arrangement having an associated rotary drive take-off, an electricity generating arrangement which includes a first generator stage including a first generator rotor and generator stator arrangement; a second generator stage including a second generator rotor and generator stator arrangement, at least of the first and second generator stage rotors is driven by the rotary drive take-off.

30 Claims, 4 Drawing Sheets

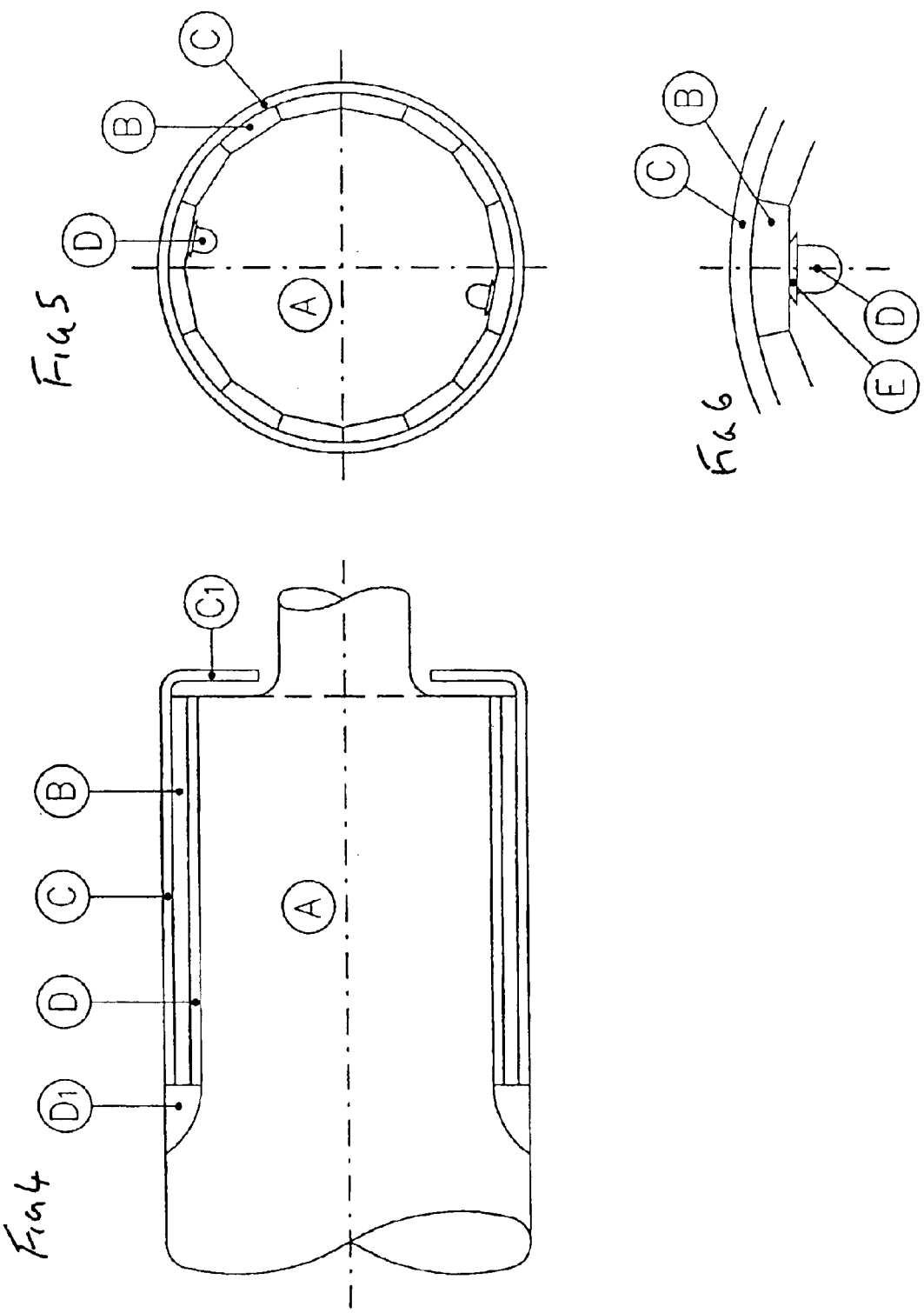

GAS TURBOMACHINERY GENERATOR

The present application is a continuation of U.S. patent application Ser. No. 09/995,152, filed Nov. 27, 2001, now abandoned.

FIELD OF THE INVENTION

The present invention relates to a gas turbomachinery electric generator and particularly to a high speed gas turbine electric generator.

DEFINITION OF THE INVENTION

According to a first aspect, the invention provides gas turbomachinery electricity generation apparatus comprising:

a gas turbomachinery arrangement;

a rotary drive take-off associated with the turbomachinery arrangement;

an electricity generating arrangement comprising:
  i) a first generator stage including a first generator rotor and generator stator arrangement; and
  ii) a second generator stage including a second generator rotor and generator stator arrangement;

wherein at least one of the first and second generator stage rotors is driven by the rotary drive take-off.

The gas turbomachinery arrangement preferably includes a gas driven turbine stage or stages. The rotary drive take-off may be associated with the gas driven turbine stage.

Beneficially, the turbomachinery arrangement includes a gas compressor stage, preferably a rotary compressor stage including a rotary impeller stage.

It is preferred that both the first and second stage generator rotors are driven by the turbomachinery arrangement.

The first and second stage generator rotors are advantageously driven by one or other of the compressor and/or turbine stages.

In one embodiment, the compressor impeller and turbine rotor are mounted upon a common shaft. In this embodiment it is preferred that the first and second rotor stages of the electricity generation arrangement are directly driven by the common shaft, preferably being arranged in series, beneficially mounted upon a common shaft (which may be the same shaft upon which the turbine rotor and compressor impeller are mounted, or a shaft coupled thereto).

In an alternative embodiment, the first and second rotor stages of the electricity generation arrangement are mounted upon separate, discrete shafts each preferably being drivingly associated with one or other of the compressor impeller and the (or a) turbine rotor.

In a further alternative embodiment, the first and second rotor stages of the electricity generation arrangement are mounted upon separate shafts each preferably being drivingly associated with one or other of the compressor impeller and the turbine rotor. In this embodiment shafts may be coupled by gear means or clutch means.

The gas compressor stage may be mounted on or connected to the take-off shaft of the turbine stage.

The turbomachinery arrangement preferably includes a combustion stage for combustion of a gas/fuel mixture. The combustion stage is preferably provided intermediate compressor stage and the turbine stage. The gas turbomachinery arrangement may be arranged to burn a gas fuel or a liquid fuel at the combustion stage. The combustion stage preferably comprises a combustion chamber in which a working gas (typically air) is heated by combustion of the fuel, which is then passed (with combustion products) to a downstream turbine.

One of the first and second generator stages is preferably more highly power rated than the other. The power rating ratio between the two stages is preferably substantially in the range 1:1.5 to 1:9. More preferably the range is substantially 1:2 to 1:4, most preferably at or about 1:2.

Beneficially one or both of the generator rotors arranged to be driven to initiate rotational operation of the turbomachinery arrangement. In this situation the relevant stage is acting as a motor rather than a generator. The apparatus therefore preferably includes means for operating at least one of the generator stages in motor mode. A control system and power supply means (typically electrical battery means) are preferably provided for this purpose. The control system preferably includes inverter means for the power supply to the or each generator stage. The inverter means is preferably arranged to charge maintain the start up power supply battery. The relevant generator stage acts as a motor to bring the relevant turbomachinery apparatus up to a rotational speed at which the gas turbomachinery becomes fully self sustaining. Most beneficially, the lower power rated stage rotor is arranged to be driven to initiate rotational operation of the turbomachinery arrangement This enables minimum power to be used to drive the turbomachinery to a level at which combustion at the combustion stage takes over.

Beneficially, the apparatus control system is capable of selecting electrical power to be supplied by one or other or both of the first and second generator stages dependent upon the output requirement of the apparatus. Inverter means and output power connections for both of the generator stages are provided for this purpose. Each generator is preferably connected to its own inverter that converts the high frequency current that is generated into a conventional alternating current or direct current supply as may be required.

Dependent upon the economics of the circumstances of the operating profile of the generator a recuperator may be provided for preheating the air by heat from the exhaust of the gas turbine before the air passes to the combustion chamber or chambers. The fuel may be a liquid hydrocarbon or a gas. A fuel supply system and combustion chamber or chambers are provided as may be required by the use of liquid fuel, by the use of gas or for dual fuelling. (In one embodiment exceptionally the compressor might be multi-staged and the turbine has a high-pressure and a low-pressure stage.)

As an example of the influence of economics upon the provisions included in the gas turbine, should the turbine generator be installed for the sole purpose of generating electrical power then it becomes economic to maximise the efficiency of generation by the provision of a recuperator. However the case for the additional capital expenditure represented by the provision of a recuperator is less strong if the turbine generator is to be used in a combined heat and power scheme.

Bearing means are preferably provided to support the generator rotors and rotational turbomachinery. Oil lubricated bearings may be utilised that may be conventional shell bearings of circular bore or shell bearings with fixed lands or tilting pad bearings or rolling element bearings that are mist lubricated. A tilting pad thrust bearing or bearings control the axial position of the rotor or rotors.

An oil supply system and an oil cooler is preferably provided to feed oil to the bearings for lubrication and for cooling. The system preferably also provides that oil or other coolant is passed through channels in the stators of the generators to carry away heat produced by the electrical losses. In another aspect of the invention the rotors of the generators may be provided with channels for the passage of flows of cooling air or other gas.

In one embodiment a compressor, a turbine stage and the rotors of the first and second generating stages (but not necessarily in that sequence) are coupled together on a common axis to form a single line. The line may or may not contain means such as a spline or a gear coupling to permit the axial length of the line adjusting itself automatically to the demands of differential expansion between the line stationary parts.

In an alternative embodiment, there may be two lines, with the compressor, a turbine stage and a rotor of one of the electricity generator stages coupled together (but not necessarily in that sequence) on a common axis on a first line, and on a second line on a common axis the rotor of the second electricity generator stage coupled together with a turbine stage driven by an appropriate fraction of products of combustion taken from the turbomachinery arrangement of the first line.

Beneficially a respective rotor of the generator arrangement includes an airway extending generally in the direction of the rotor axis permitting cooling air or other gas to be drawn along the rotor. Cooling air is drawn along the airway. This provides significant benefit in aiding cooling of the rotor.

According a further aspect the invention therefore provides a rotor of an electric generator or motor, the rotor including an airway extending generally the direction of the rotor axis permitting cooling air or other gas be drawn along the rotor.

The airway preferably extends adjacent the outer surface the rotor. The airway preferably an inlet portion proximate an end of the rotor. A shroud portion preferably overhangs the end of the rotor, desirably defining an air gap between the rotor end and the shroud. The shroud preferably overhangs the airway inlet.

An airway outlet is preferably provided to permit the cooling air vent from the rotor at a position spaced longitudinally from the inlet.

In one embodiment, the rotor comprises a permanent magnet armature having one or more permanent magnets positioned the radial periphery of the rotor body. The airway (typically formed a groove) is preferably positioned to extend along the rotor intermediate the permanent magnet and the rotor body. A securing rim or annulus (preferably shrink fitted around the armature) extends around the magnet armature. The magnet armature preferably seated in a seat formed on the rotor body.

The invention will now be further described in specific embodiments, by way of example only and with reference to accompanying drawings, in which:

BRIEF DESCRIPTION OF THE DRAWINGS

FIG. 4 is a schematic view of a rotor for a motor generator in accordance with a further aspect of the invention;

FIG. 5 is an end view of the rotor of FIG. 4;

FIG. 6 is a detail view of a part of the rotor of FIGS. 4 and 5.

DETAILED DESCRIPTION OF THE PREFERRED EMBODIMENTS

Figure 1:
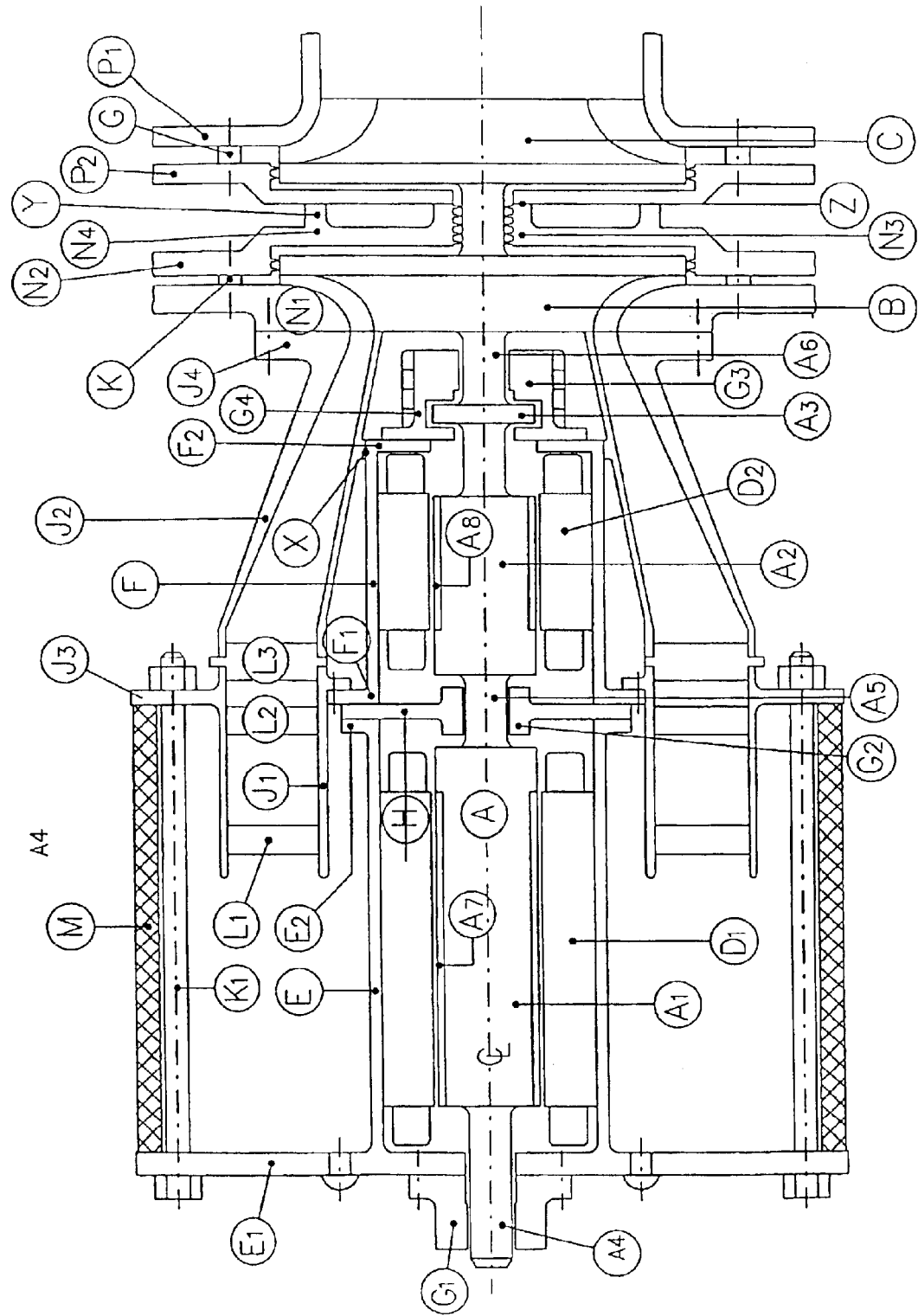
FIG. 1 is a schematic sectional view of an exemplary turbomachinery generator according to the invention.
Figure 2:
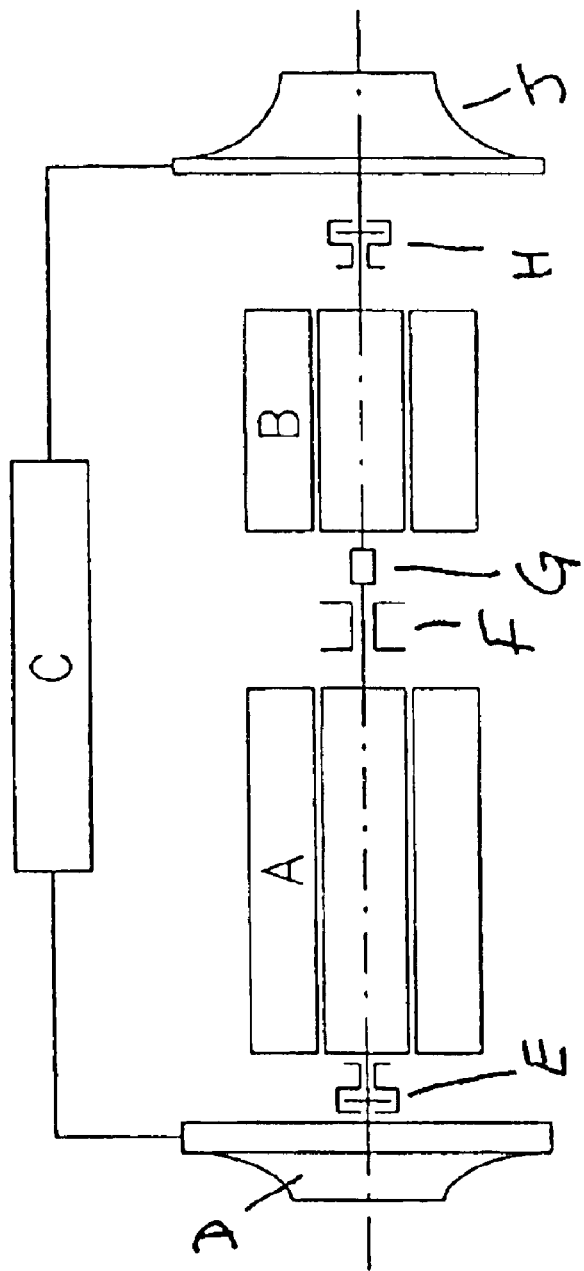
FIG. 2 is a schematic view of an alternative embodiment of turbomachinery generator according to the invention.

Referring to the drawings, one embodiment of the invention is illustrated in FIG. 1. A monobloc rotor A has a generator armature $A_1$ of a generator of larger power rating and an armature $A_2$ of a lesser power rated generator. A thrust collar $A_3$ and the journals $A_4$, $A5$ and $A_6$ support the rotor A. $A_7$ and $A_8$ are permanent magnets held by their shrunk on sleeves (that are not shown in FIG. 1). Overhung from the monobloc rotor but separate from it are the impeller B of the centrifugal compressor and the impeller C of the inward radial flow turbine. These impellers are assembled on the monobloc rotor by a central tie bolt (not shown) and transmit torque to the monobloc rotor via Hirth couplings or other forms of co-axial coupling compliant of differential expansion between the elements they connect (not shown). $D_1$ and $D_2$ are the stators of the generators.

The casing of the generator comprises the casing E with its flanges $E_1$ and $E_2$, the casing F with its flanges $F_1$ and $F_2$. The monobloc rotor runs in the journal bearings $G_1$, $G_2$ and $G_3$ and the axial position of the rotor is fixed by the thrust bearing $G_4$. The bearing $G_1$ is unsplit and its housing is bolted to the flange $E_1$. The bearing $G_2$ is a bearing split on a diametral-axial plane and held by the diaphragm H that is split on the same plane as its bearing The bearing $G_3$ and the thrust bearing $G_4$ are split on a diametral-axial plane and are held in a split housing bolted to the flange $F_2$.

Bolting is provided such that H may be positioned and bolted to $E_2$ before the casing F is bolted to $E_2$.

The inlet to the compressor comprises the inner cone $J_1$ that is supported by casing F at X (and by its flange that is bolted to the flange $F_1$) and the outer cone $J_2$ that is supported by its flange $J_3$. The flange $J_3$ is held to the flange $E_1$ by the columns $K_1$. The support at X is a sliding support. The separation of the inner and outer cones is maintained by the struts $L_1$ and $L_2$ that are of aerodynamic section. Some or all of these struts are hollow provide conduit for the electrical leads the stators $D_1$, and $D_2$. The inlet is provided with the variable inlet guide vanes whose angle is varied by one of the mechanisms well known in the art. Air enters the compressor inlet via the filter M that encircles the columns $K_1$.

The casing of the compressor comprises the out casing $N_1$ and the inner casing $N_2$; with an inner annular upstand $N_3$, and an outer annular upstand $N_4$. The inner casing bolt by the flange $J_4$ to the outer cone $J_2$ the inlet to the compressor The inner and outer casings are held together by the spacers K the vaneless space and by the volute (not shown).

The casing of the turbine comprises the outer casing $P_1$ and the inner casing $P_2$. The inner casing is bolted at Z to the inner annular upstand $N_3$ of the inner casing of the compressor. At the radius of this bolting there is little differential expansion between the two inner casings. But because of differential expansion the casings must not be bolted together at the outer annulus and there their separation maintained by the outer annular upstand N4 that rests at Y against the inner casing of the turbine. Contact will be maintained at Y because the temperature gradient across $P_2$ will tend to make $P_2$ concave wit its concavity facing the inner casing $N_2$ the compressor.

The inner and outer casings of the turbine are held together by the spacers G that should it be necessary can be cooled by a bleed of air from the exhaust of the compressor.

The casings of the compressor and of the turbine are supported entirely by the cone $J_2$. Consequently the rigidity of this cone and the rigidity of its mounting with relation to the casings of the generators are of great importance. To increase the rigidity of its mounting the flange $E_1$ is provided with stiffening webs either internally, externally or in both positions. (The webs are not shown in FIG. 1.) The torsional stiffness with which the columns $K_1$ hold the cone $J_2$ is also important and is enhanced for example by diagonal struts connecting adjacent columns $K_1$ say in three equally spaced places.

The inlet guide vanes of the turbine are not shown nor the combustion chamber or chambers that connect the exhaust of the compressor with the inlet of the turbine.

Another embodiment of the invention is illustrated running line is the centrifugal compressor D, a combined thrust and journal bearing E, generator A, a journal bearing and the right hand termination of the first shaft. The beginning of the second shaft connected with the first by a spline or gear coupling G, generator B, a combined journal and thrust bearing H, and the impeller of the turbine J. C is the combustion chamber or chambers. In comparison with the arrangement FIG. 1 this arrangement provides completely unimpeded compressor entry and a greater space which to arrange the combustion chamber or chambers. Its disadvantage is that the second shaft is held at its left-hand end in a spline gear coupling G rather than in a bearing.

Figure 3:
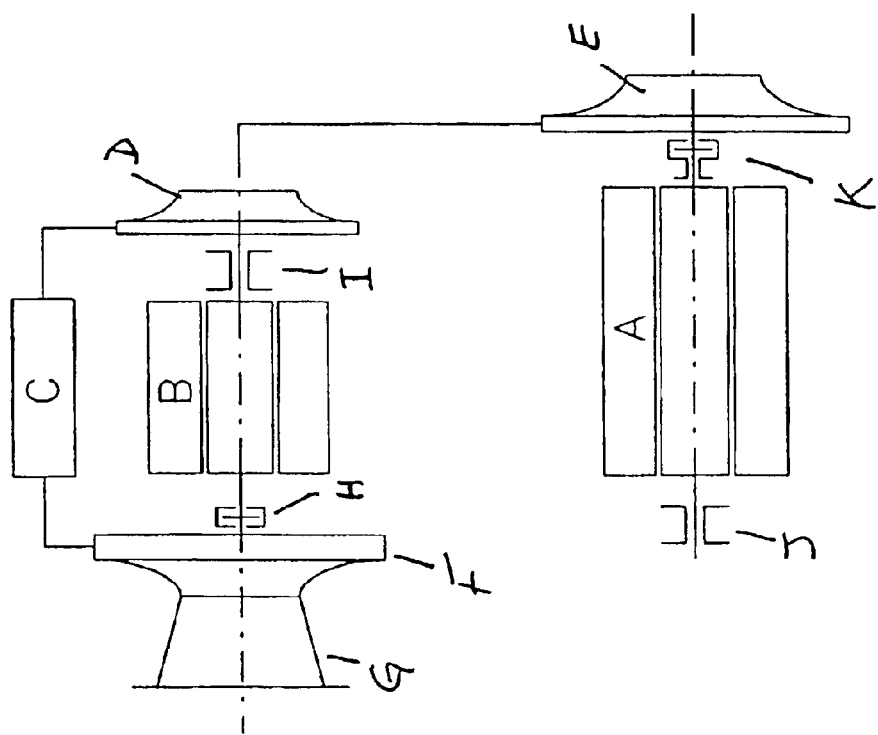
FIG. 3 is a schematic view of a further alternative embodiment of turbomachinery generator according to the invention.

Another embodiment the invention is diagrammatically FIG. 3. It comprises two lines, a first line with generator B together with a gas turbine D that also generates the gas that drives the power turbine E of the second line with generator A. From left to right the first line is a journal bearing followed by a centrifugal compressor F that may be preceded by one more no axial compressor stages G (or a centrifugal compressor with two centrifugal stages) followed by thrust bearing H and also journal bearing should such be needed, followed by generator B followed by a journal bearing I followed by the radial inflow turbine stage D. The second line from left to right is a journal bearing J followed by generator A followed by a combined journal and thrust bearing K followed by the radial inflow power turbine stage E. C is the combustion chamber or chambers. The advantage of this arrangement that facilitates the provision of additional compressor stages or an additional compressor stage. The additional stage or stages would produce a greater pressure ratio and improved turbine efficiency.

A means of cooling the armature of high-speed permanent magnet motor or generator is illustrated in FIGS. 4 to 6. In the figures A is the rotor, B is a permanent magnet, C is the band shrunk around the magnets with such pre-strain as to keep the magnets on their seats at the highest speed for which the rotor is designed. D is a channel milled along the centre of each magnet seat. (Two channels only are shown in the figure for clarity but every seat is provided with a respective channel.) The channels emerge the end of the magnets and sleeve as illustrated $D_1$. $C_1$ is a lip formed as part of the sleeve or as otherwise constructed. The rotor is cooled by a stream of cool air or other gas flowing through the channels from the entrances of the channels beneath the lip to their outlets $D_1$. The air in the gap between the inner surface of the lip and the end of the armature will rotate substantially the speed of rotation of the rotor. The centrifugal action will produce a greater pressure air or gas at the entrances of the channels and because of that pressure rise air or gas will flow through the channels the outlets $D_1$. The flow of air or gas will carry heat away from the rotor. (The pressure rise for an armature cooled by air of 100 mm dia at 50000 rpm approximately 0.34 bar.)

In the construction of a rotor the magnets are glued their seats to hold them in position whilst the sleeve is being pressed over them. To prevent the channels becoming blocked by adhesive they are filled by plastic strips before the magnets are glued in place and the strips are withdrawn after the sleeve has been pressed over the magnets. Alternatively the channels are machined with grooves to take the dovetail strip E as illustrated in FIG. 6.

It is a common practice to offset the magnets by a small angle from the axial direction. In such an instance the channels are milled on helical paths that keep them everywhere close to the centre lines of the seats and their magnets.

The generator according to the invention is designed to operate at high speed (50,000 rpm) and produce power output typically in the range 50–60 KW. Because of its design, the generator is highly compact and light for its power output. The split generator arrangement enables power output to be tailored to end use circumstances and also enables the lower rated generator (10–15 KW) to be used as a motor to start up the generator. The generator is potentially attractive as a local source of power in situations where costly power lines would otherwise have to be provided to give a connection to a distant supply grid.

What is claimed is:

1. A gas turbomachinery electricity generation apparatus comprising:

a gas turbomachinery arrangement;

a rotary drive take-off associated with said gas turbomachinery arrangement;

an electricity generating arrangement comprising a first generator stage including a first generator rotor and generator stator arrangement and a second generator stage including a second generator rotor and generator stator arrangement; and wherein at least one of said first and second generator rotors is driven by said rotary drive take-off; and wherein said gas turbomachinery arrangement includes a rotary compressor stage including a rotary impeller stage.

2. A gas turbomachinery electricity generation apparatus as set forth in claim 1 wherein said gas turbomachinery arrangement includes at least one gas driven turbine stage.

3. A gas turbomachinery electricity generation apparatus as set forth in claim 2 wherein said rotary drive take-off is associated with said at least one gas driven turbine stage.

4. A gas turbomachinery electricity generation apparatus as set forth in claim 1 wherein said gas turbomachinery arrangement includes a gas compressor stage.

5. A gas turbomachinery electricity generation apparatus comprising:

a gas turbomachinery arrangement;

a rotary drive take-off associated with said gas turbomachinery arrangement;

an electricity generating arrangement comprising a first generator stage including a first generator rotor and generator stator arrangement and a second generator stage including a second generator rotor and generator stator arrangement; and wherein at least one of said first and second generator rotors is driven by said rotary drive take-off; and wherein said gas turbomachinery arrangement includes a common shaft, a gas compressor stage having a rotary impeller mounted on said common shaft, and a gas turbine stage having a turbine rotor mounted on said common shaft.

6. A gas turbomachinery electricity generation apparatus as set forth in claim 5 wherein said first and second generator stages of said electricity generation arrangement being directly driven by said common shaft.

7. A gas turbomachinery electricity generation apparatus as set forth in claim 6 wherein said first and second generator stages of said electricity generation arrangement are arranged in series.

8. A gas turbomachinery electricity generation apparatus as set forth in claim 6 wherein said first and second generator stages of said electricity generation arrangement are mounted on said common shaft.

9. A gas turbomachinery electricity generation apparatus comprising:
   a gas turbomachinery arrangement comprising a gas compressor stage having a rotary impeller and a gas turbine stage;
   a rotary drive take-off associated with said gas turbomachinery arrangement;
   an electricity generating arrangement comprising a first generator stage including a first generator rotor and a generator stator arrangement, a second generator stage including a second generator rotor and a generator stator arrangement, a first shaft, and a second shaft separate from said first shaft, said first generator stage being mounted on said first shaft and said second generator stage being mounted on said second shaft; and
   wherein at least one of said first and second generator rotors is driven by said rotary drive take-off.

10. A gas turbomachinery electricity generation apparatus as set forth in claim 9 wherein said first and second rotor stages of said generation arrangement are drivingly associated with one or other of compressor impeller and the (or a) turbine rotor.

11. A gas turbomachinery electricity generation apparatus as set forth in claim 9 including either one of a gear means and clutch means to couple said first shaft and said second shaft together.

12. A gas turbomachinery electricity generation apparatus comprising:
   a gas turbomachinery arrangement;
   a rotary drive take-off associated with said gas turbomachinery arrangement;
   an electricity generating arrangement comprising a first generator stage including a first generator rotor and generator stator arrangement and a second generator stage including a second generator rotor and generator stator arrangement; and
   wherein at least one of said first and second generator rotors is driven by said rotary drive take-off; and
   wherein said gas turbomachinery arrangement includes at least one gas driven turbine stage and a gas compressor stage, said gas compressor stage being mounted on or connected to a take-off shaft of said at least one gas driven turbine stage.

13. A gas turbomachinery electricity generation apparatus as set forth in claim 12 wherein said gas turbomachinery arrangement includes a combustion stage for combustion of a gas/fuel mixture.

14. A gas turbomachinery electricity generation apparatus as set forth in claim 13 wherein said combustion stage is provided intermediate said gas compressor stage and said at least one gas driven turbine stage.

15. A gas turbomachinery electricity generation apparatus as set forth in claim 13 wherein said gas turbomachinery arrangement is arranged to burn a gas fuel or a liquid fuel at said combustion stage.

16. A gas turbomachinery electricity generation apparatus comprising:
   a gas turbomachinery arrangement;
   a rotary drive take-off associated with said gas turbomachinery arrangement;
   an electricity generating arrangement comprising a first generator stage including a first generator rotor and generator stator arrangement and a second generator stage including a second generator rotor and generator stator arrangement; and
   wherein at least one of said first and second generator rotors is driven by said rotary drive take-off;
   wherein said gas turbomachinery arrangement includes a combustion stage for combustion of a gas/fuel mixture; and
   wherein said combustion stage comprises a combustion chamber in which a working gas is heated by combustion of the fuel, which is then passed to a downstream turbine.

17. A gas turbomachinery electricity generation apparatus as set forth in claim 16 wherein a power rating ratio between said first and second generator stages is substantially in a range of 1:1.5 to 1:9.

18. A gas turbomachinery electricity generation apparatus as set forth in claim 17 wherein the power rating ratio between said first and second generator stages is substantially in the range of 1:2 to 1:4.

19. A gas turbo machinery electricity generation apparatus as set forth in claim 1 wherein at least one of said first and second generator rotors is arranged to be driven to initiate rotational operation of said gas turbomachinery arrangement.

20. A gas turbomachinery electricity generation apparatus as set forth in claim 1 including a means for operating at least one of said first and second generator stages in a motor mode.

21. A gas turbomachinery electricity generation apparatus as set forth in claim 20 including a control system means for operating at least one of said first and second generator stages in a motor mode.

22. A gas turbomachinery electricity generation apparatus as set forth in claim 21 wherein said control system includes an inverter means for power supply to at least one of said first and second generator stages.

23. A gas turbomachinery electricity generation apparatus as set forth in claim 22 wherein said inverter means is arranged to charge/maintain a start-up power supply battery.

24. A gas turbomachinery electricity generation apparatus as set forth in claim 20 wherein a lower power rated stage rotor is arranged to be driven to initiate rotational operation of said gas turbomachinery arrangement.

25. A gas turbomachinery electricity generation apparatus as set forth in claim 21 wherein said control system is capable of selecting electrical power to be supplied by at least one of said first and second generator stages dependent upon the output requirement of said apparatus.

26. A gas turbomachinery electricity generation apparatus comprising:
   a gas turbomachinery arrangement;
   a rotary drive take-off associated with said gas turbomachinery arrangement;
   an electricity generating arrangement comprising a first generator stage including a first generator rotor and generator stator arrangement and a second generator stage including a second generator rotor and generator stator arrangement; and
   wherein at least one of said first and second generator rotors is driven by said rotary drive take-off;
   wherein said gas turbomachinery arrangement includes a combustion stage for combustion of a gas/fuel mixture;

wherein said gas turbomachinery arrangement is arranged to burn a gas fuel or a liquid fuel at said combustion stage; and wherein said gas turbomachinery arrangement includes at least one gas driven turbine stage, a gas compressor stage, and recuperator means for preheating the air by heat from the exhaust of the gas turbine before the air passes to the combustion chamber or chambers.

27. A gas turbomachinery electricity generation apparatus comprising:

a gas turbomachinery arrangement;

a rotary drive take-off associated with said gas turbomachinery arrangement;

an electricity generating arrangement comprising a first generator stage including a first generator rotor and generator stator arrangement and a second generator stage including a second generator rotor and generator stator arrangement; and wherein at least one of said first and second generator rotors is driven by said rotary drive take-off; and wherein said gas turbomachinery arrangement has a compressor stage and a turbine stage and said first and second generator rotors are coupled together on a common axis to form a single line.

28. A gas turbomachinery electricity generation apparatus as set forth in claim 27 wherein said single line includes means for permitting an axial length of the single line adjusting itself automatically to the demands of differential expansion between the single line and stationary parts.

29. A gas turbomachinery electricity generation apparatus comprising:

a gas turbomachinery arrangement;

a rotary drive take-off associated with said gas turbomachinery arrangement;

an electricity generating arrangement comprising a first generator stage including a first generator rotor and generator stator arrangement and a second generator stage including a second generator rotor and generator stator arrangement; and wherein at least one of said first and second generator rotors is driven by said rotary drive take-off; and wherein said gas turbomachinery arrangement includes at least one gas driven turbine and a gas compressor stage coupled together on a common axis on a first line, and on a second line on a common axis the rotor of said second generator stage coupled together with a turbine stage driven by an appropriate fraction of products of combustion taken from said gas turbomachinery arrangement of the first line.

30. A gas turbomachinery electricity generation apparatus comprising:

a gas turbomachinery arrangement;

a rotary drive take-off associated with said gas turbomachinery arrangement;

an electricity generating arrangement comprising a first generator stage including a first generator rotor and generator stator arrangement and a second generator stage including a second generator rotor and generator stator arrangement; and wherein at least one of said first and second generator rotors is driven by said rotary drive take-off; and wherein a respective rotor of the generator arrangement includes an airway extending generally in the direction of the rotor axis permitting cooling air or other gas to be drawn along the rotor.

* * * * *